United States Patent [19]
Zhao

[11] Patent Number: 5,897,500
[45] Date of Patent: Apr. 27, 1999

[54] ULTRASONIC IMAGING SYSTEM AND METHOD FOR DISPLAYING COMPOSITE FUNDAMENTAL AND HARMONIC IMAGES

[75] Inventor: Danhua Zhao, Sunnyvale, Calif.

[73] Assignee: Acuson Corporation, Mountain View, Calif.

[21] Appl. No.: 08/993,947

[22] Filed: Dec. 18, 1997

[51] Int. Cl.$^6$ ........................................... A61B 8/00
[52] U.S. Cl. ................................ 600/443; 600/447
[58] Field of Search ............................ 600/458, 443, 600/447; 367/138, 11

[56] References Cited

U.S. PATENT DOCUMENTS

| | | |
|---|---|---|
| 3,640,271 | 2/1972 | Horton . |
| 4,712,037 | 12/1987 | Verbeek et al. . |
| 5,111,823 | 5/1992 | Cohen . |
| 5,115,809 | 5/1992 | Saitoh et al. . |
| 5,135,000 | 8/1992 | Akselrod et al. . |
| 5,158,071 | 10/1992 | Umemura et al. . |
| 5,195,520 | 3/1993 | Schlief et al. . |
| 5,197,477 | 3/1993 | Peterson et al. . |
| 5,233,994 | 8/1993 | Shmulewitz . |
| 5,255,683 | 10/1993 | Monaghan . |
| 5,287,753 | 2/1994 | Routh et al. . |
| 5,313,948 | 5/1994 | Murashita et al. . |
| 5,358,466 | 10/1994 | Aida et al. . |
| 5,386,830 | 2/1995 | Powers et al. . |
| 5,396,285 | 3/1995 | Hedberg et al. . |
| 5,409,688 | 4/1995 | Quay . |
| 5,410,205 | 4/1995 | Gururaja . |
| 5,410,516 | 4/1995 | Uhlendorf et al. . |
| 5,417,213 | 5/1995 | Prince . |

(List continued on next page.)

FOREIGN PATENT DOCUMENTS

| | | |
|---|---|---|
| 0 357 164 | 10/1991 | European Pat. Off. . |
| 0 770 352 A1 | 5/1997 | European Pat. Off. . |
| 0851241 A2 | 7/1998 | European Pat. Off. . |
| WO 98/20361 | 5/1998 | WIPO . |

OTHER PUBLICATIONS

T.G. Leighton, "Transient excitation of insonated bubbles." Research Notes.

Eric J. Chen, et al., "Young's Modulus Measurements of Soft Tissues with Application to Elasticity Imaging." IEEE Transactions on Ultrasonics, Ferroelectrics, and Frequency Control, vol. 43, No. 1, Jan. 1996.

Pi Hsien Chang, et al., "Second Harmonic Imaging and Harmonic Doppler Measurements with Albunex." IEEE Transactions on Ultrasonics, Ferroelectrics, and Frequency Control, vol. 42, No. 6, Nov. 1996.

Marc Gensane, "Bubble population measurements with a parametric array." 1994 Acoustical Society of America, 95 (6) Jun.

Ken Ishihara et al., "New Approach to Noninvasive Manometry Based on Pressure Dependent Resonant Shift of Elastic Microcapsules in Ultrasonic Frequency Characteristics." Japanese J. of Applied Physics, vol. 2 (1988).

Shmuel Gottlieb, M.D. et al., "Effect of Pressure on Echocardiographic Videodensity from Sonicated Albumin: An In Vitro Model." J. Ultrasound Med. 14 (1995).

J. W. Norris, "The non–linear oscillation of a radially symmetric bubble in a time periodic pressure field." Dynamics and Stability of Systems, vol. 9, No. 1 (1994).

(List continued on next page.)

Primary Examiner—Marvin M. Lateef
Assistant Examiner—Maulin Patel
Attorney, Agent, or Firm—Brinks Hofer Gilson & Lione; Craig A. Summerfield

[57] ABSTRACT

An ultrasonic imaging system and method acquire fundamental mode and harmonic mode ultrasonic image signals from a subject with a transducer. These image signals are then combined to form a composite image. This composite image includes a nearfield image region modulated primarily as a function of the fundamental mode ultrasonic image signals, and a middlefield or farfield image region modulated primarily as a function of the harmonic mode image signals. In this way, excellent images can be obtained throughout the imaged range.

28 Claims, 4 Drawing Sheets

U.S. PATENT DOCUMENTS

| | | |
|---|---|---|
| 5,417,214 | 5/1995 | Roberts et al. . |
| 5,425,366 | 6/1995 | Reinhardt et al. . |
| 5,433,204 | 7/1995 | Olson . |
| 5,433,207 | 7/1995 | Pretlow, III . |
| 5,435,311 | 7/1995 | Umemura et al. . |
| 5,438,554 | 8/1995 | Seyed-Bolorforosh et al. . |
| 5,443,071 | 8/1995 | Banjanin et al. . |
| 5,456,255 | 10/1995 | Abe et al. . |
| 5,456,257 | 10/1995 | Johnson et al. . |
| 5,462,057 | 10/1995 | Hunt et al. . |
| 5,469,849 | 11/1995 | Sasaki et al. . |
| 5,471,990 | 12/1995 | Thirsk . |
| 5,479,926 | 1/1996 | Ustuner et al. . |
| 5,482,046 | 1/1996 | Deitrich . |
| 5,526,816 | 6/1996 | Arditi . |
| 5,540,909 | 7/1996 | Schutt ................................... 600/458 |
| 5,558,092 | 9/1996 | Unger et al. . |
| 5,560,364 | 10/1996 | Porter . |
| 5,568,813 | 10/1996 | Deitrich et al. . |
| 5,577,505 | 11/1996 | Brock-Fisher et al. . |
| 5,579,768 | 12/1996 | Klesenski . |
| 5,579,770 | 12/1996 | Finger . |
| 5,588,435 | 12/1996 | Weng et al. . |
| 5,601,085 | 2/1997 | Ostensen et al. . |
| 5,601,086 | 2/1997 | Pretlow, III et al. . |
| 5,608,690 | 3/1997 | Hossack et al. ........................ 367/138 |
| 5,617,862 | 4/1997 | Cole et al. . |
| 5,628,322 | 5/1997 | Mine ...................................... 600/458 |
| 5,632,277 | 5/1997 | Chapman et al. . |
| 5,724,976 | 3/1998 | Mine et al. . |
| 5,740,128 | 4/1998 | Hossack et al. ........................ 367/138 |

OTHER PUBLICATIONS

Michael S. Longuet–Higgins, Resonance in nonlinear bubble oscillations. J. Fluid Mech. (1991) vol. 224.

Chiang C. Mei, et al., "Parametric resonance of a spherical bubble." J. Fluid Mech. (1991) vol. 229.

V.L. Newhouse, et al., "Bubble size measurements using the nonlinear mixing of two frequencies." J. Acoust. Soc. Am. 75 (5), May 1984.

Janet B. Jones–Oliveira, et al., "Transient fluid—solid interaction of submerged spherical shells revisited: Proliferation of frequencies and acoustic radiation effects." Acoustical Society of America, 96(2) Pt. 1, Aug. 1994.

Chandra M. Sehgal, PhD., et al., "Sonographic Enhancement of Renal Cortex by Contrast Media." J. Ultrasound Med, 14 (1995).

"Abstract Session IV Contrast and Ischemia" and "Post Session A New Technologies". Journal of the American Society of Echocardiography, vol. 8, No. 3, May 1995.

Chandra M. Sehgal, PhD, et al., "Influence of Postprocessing Curves on Contrast—Echographic Imaging: Preliminary Studies." J. Ultrasound Med, 14 (1995).

Deborah J. Rubens, M.D., et al., "Sonoelasticity Imaging of Prostate Cancer: In Vitro Results." Radiology, vol. 995, No. 2, 1995.

Kotaro Sato, et al., "Numerical analysis of a gas bubble near a rigid boundary in an oscillatory pressure field." J. Acoustical Society of America, 95 (5), May 1994.

L.W. Anson et al., "Ultrasonic scattering from spherical shells including viscous and thermal effects." J. Acoustical Society of America, 93 (4), Apr. 1993.

B. Schrope, et al., "Simulated Capillary Blood Flow Measurement Using A Nonlinear Ultrasonic Contrast Agent," Ultrasonic Imaging 14 (1992).

Fred Lee, Jr., M.D., et al., "Sonoelasticity Imaging: Results in in Vitro Tissue Specimens." Radiology, vol. 181, No. 1, 1991.

Kevin J. Parker, PhD, et al., "Sonoelasticity of Organs: Shear Waves Ring a Bell." J. Ultrasound Med., 11 (1992).

William Armstrong, M.D., et al., "American Society of Echocardiography Position Paper on Contrast Echocardiography." draft 1—Jun. 6, 1994.

K.J. Parker, et al., "Tissue Response to Mechanical Vibrations for 'Sonoelasticity Imaging'." Ultrasound in Med. & Biol., vol. 16, No. 3, (1990).

Nico de Jong, "Physical properties and technical aspects of ultrasound contrast agents." (one page).

Robert M. Lerner, et al., "'Sonoelasticity'+Images Derived from Ultrasound Signals in Mechanically Vibrated Tissues." Ultrasound in Med. & Biol., vol. 16, No. 3, (1990).

J. Ophir, et al., "Elastography: A Quantitative Method for Imaging the Elasticity of Biological Tissues." Ultrasonics Imaging 13 (1991).

J.A. Hossack et al., "Improving transducer performance using multiple active layers." SPIE vol. 1733 (1992).

Volkmar Uhlendorf, et al., "Nonlinear Acoustical Response of Coated Microbubbles in Diagnostic Ultrasound." 1994 Ultrasonics Symposium.

John A. Hossack, et al., "Improving the Characteristics of a Transducer Using Multiple Piezoelectric Layers." IEEE Transactions on Ultrasonics, Ferroelectrics, and Frequency Control, vol. 40, No. 2, Mar. 1993.

H. Edward Karrer, et al., "A Phased Array Acoustic Imaging System for Medical Use." 1980 Ultrasonics Symposium.

"HP Ultrasound Technologies—Viability." About HP Ultrasound Imaging, WWW document, 1997.

Ted Christopher, "Finite Amplitude Distortion–Based Inhomogeneous Pulse Echo Ultrasonic Imaging." IEEE Transactions on Ultrasonics, Ferroelectrics, and Frequency Control, vol. 44, No. 1, Jan. 1997.

"Supplement to Journal of the American College of Cardiology" American College of Cardiology, $45^{th}$ Annual Scientific Session, Mar. 24–27, 1996 pp. 21A, 63A, 239–240A.

Yang–Sub Lee, et al., "Time–domain modeling of pulsed finite–amplitude sound beams." 1995 Acoustical Society of America, 97 (2), Feb. 1995.

Michalakis A. Averkious, et al., "Self–demodulation of amplitude–and frequency–modulated pulses in a thermoviscous fluid." J. Acoustical Society of America, 94 (5), Nov. 1993.

Amir, et al., IEEE UFFC, vol. 33, pp. 402–411, 1986.

Magin, et al., Ultrasonic Imaging, vol. 4, No. 3, pp. 267–281, 1982.

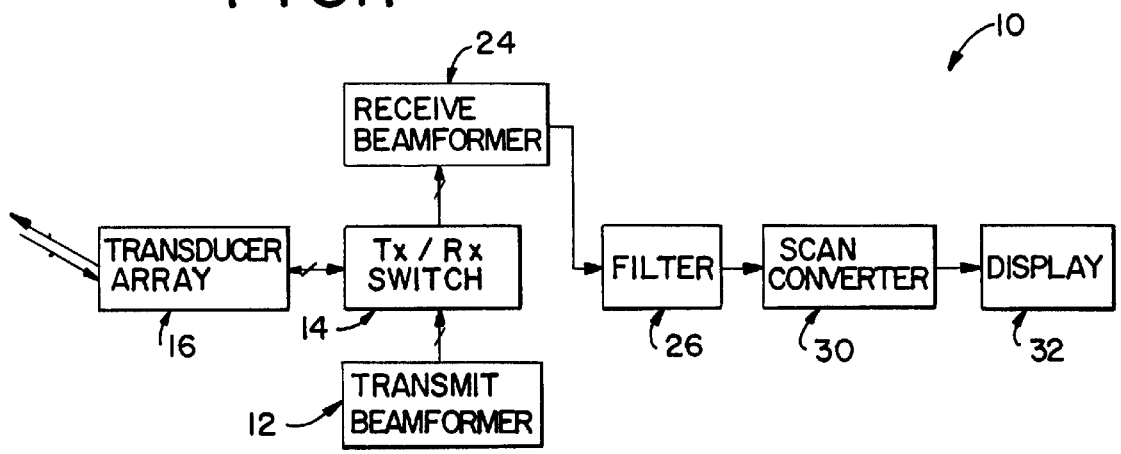
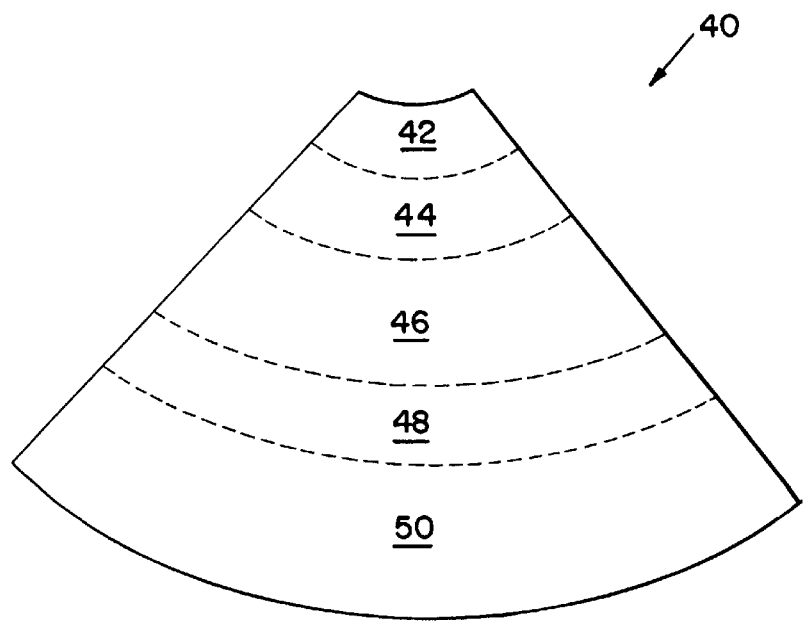

ULTRASONIC IMAGING SYSTEM AND METHOD FOR DISPLAYING COMPOSITE FUNDAMENTAL AND HARMONIC IMAGES

BACKGROUND

This invention relates to ultrasonic imaging systems and methods, and particularly to ultrasonic imaging systems and methods that utilize both harmonic and fundamental imaging modes.

Ultrasonic imaging systems that combine ultrasonic images from multiple transmit beams to form a single improved image are described for example in U.S. Pat. Nos. 5,568,813; 5,111,824; 5,462,057; and 5,579,770. The methods described in these patents however do not address the issue of providing high image quality in harmonic images of technically difficult examinations.

Hossack et al. U.S. patent application Ser. No. 08/638,918, assigned to the assignee of the present invention, discloses a method and system that combine nearfield harmonic imaging and farfield fundamental imaging to create a single improved image. This application also discloses a system and method that combine a nearfield image which is an amplitude matched combination of fundamental and harmonic signals with a farfield fundamental image to form a single improved image.

In spite of the improvements provided in the above identified Hossack application, a need presently exists for an ultrasonic imaging system and method that provide improved nearfield imaging, particularly for use in harmonic imaging systems used to image tissue without added non-linear contrast agent. In such cases, particularly in technically difficult examinations, the nearfield and farfield performance may be less than optimum because of small nonlinear propagation distances in the nearfield and decreases in the signal to noise ratio in the farfield.

SUMMARY

The present invention is defined by the following claims, and nothing in this section should be taken as a limitation on those claims. By way of introduction, it can be stated that the method and apparatus described below acquire fundamental mode ultrasonic image signals and harmonic mode ultrasonic image signals from a subject. The fundamental and harmonic mode image signals are combined to form a composite image, which includes a nearfield image region that is modulated primarily as a function of the fundamental mode ultrasonic image signals, and a middlefield or farfield image region that is modulated primarily as a function of the harmonic mode ultrasonic image signals. By using the fundamental mode image signals preferentially in the nearfield, image quality is enhanced.

BRIEF DESCRIPTION OF THE DRAWINGS

FIG. 1 is a block diagram of an ultrasonic imaging system that incorporates a presently preferred embodiment of this invention.

FIG. 2 is a schematic diagram of a composite image generated with the system of FIG. 1.

DETAILED DESCRIPTION OF THE PRESENTLY PREFERRED EMBODIMENT

Figure 3:
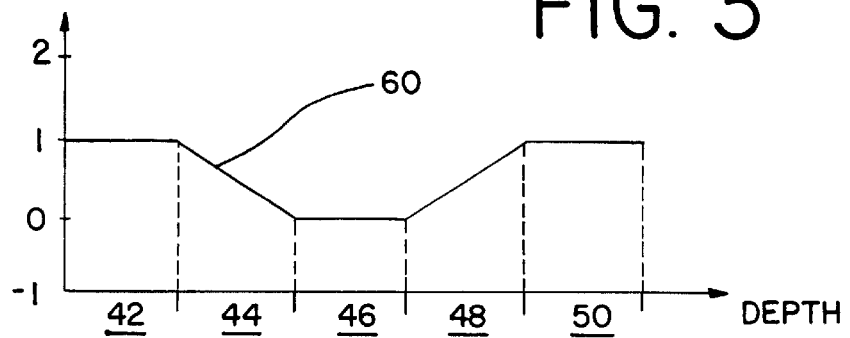
FIGS. 3 and 4 are graphs of fundamental and harmonic weighting functions, respectively, used in the formation of the image of FIG. 2.

Turning now to the drawings, FIG. 1 shows a block diagram of a medical ultrasonic imaging system 10 that provides improved image quality by combining nearfield fundamental, middlefield harmonic, and farfield fundamental images together to create a composite image providing improved resolution throughout the displayed depth.

The system 10 includes a transmit beamformer 12, a transmit/receive switch 14, a phased transducer array 16, a receive beamformer 24, a filter 26, a scan converter 30, and a display 32. The transmit beamformer 12 generates shaped transmit waveforms so that the transmitted harmonic frequency power is suppressed. The receive beamformer 24 is operative to form an acoustic beam at either the received fundamental frequency, or at a harmonic of the received fundamental frequency, such as the second harmonic for example. The filter 26 is adjustable to pass either the fundamental signals or the harmonic signals. The scan converter 30 is operative to store at least two received acoustic beams and to splice them into a single scan line as described below.

FIG. 2 is a schematic diagram of a composite image 40 formed on the display 32 of FIG. 1. The image 40 includes five separate regions: a nearfield region 42, a middlefield region 46, a farfield region 50, a nearfield compounded region 44, and a farfield compounded region 48. The terms nearfield, middlefield, and farfield are not intended to define any specific ranges. Rather, these terms define relative ranges, with the nearfield being the closest to the transducer array 16 of FIG. 1.

Figure 4:
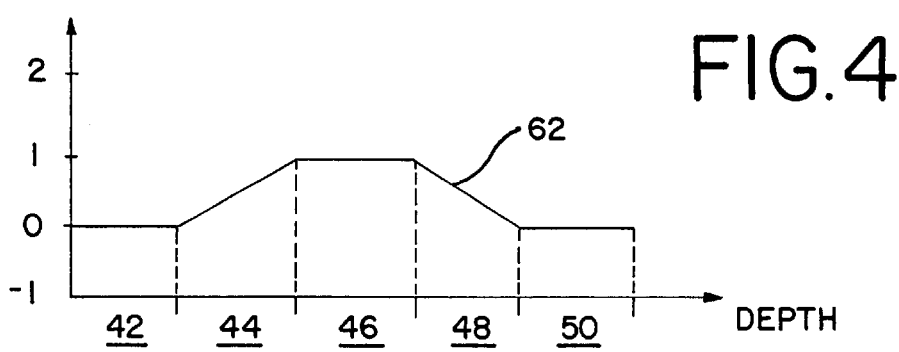

In this embodiment, the system 10 generates a fundamental beam and a harmonic beam along the same azimuthal direction, and then combines the two to form a single scan line with two piece-wise linear weighting functions as shown in FIGS. 3 and 4. The fundamental weighting function 60 of FIG. 3 has a magnitude of one in the nearfield region 42 and the farfield region 50. The function 60 decreases linearly from one to zero in the nearfield compounded region 44, and remains at zero in the middlefield region 46 before increasing linearly from zero to one in the farfield compounded region 48. Although the function 60 is shown as a linear function in the two compounded regions in FIG. 3, nonlinear functions can also be used.

The harmonic weighting function 62 of FIG. 4 is formed by subtracting the function 60 from 1, such that the sum of the two weighting functions 60, 62 is equal to 1 at any depth.

The fundamental and harmonic beams are combined in the scan converter by multiplying the fundamental beam by the fundamental weighting function 60 of FIG. 3, multiplying the harmonic beam by the harmonic weighting function 62 of FIG. 4, and then summing the weighted fundamental and harmonic beams to create a composite beam that is used for display purposes.

In another embodiment, the system 10 is operated to acquire a first fundamental beam having a nearfield transmit focus, a harmonic beam having a middlefield transmit focus, and a second fundamental beam having a farfield transmit focus. These three acquired beams are then combined to produce a composite beam. The combination is performed using the harmonic weighting function 62 of FIG. 4 for the harmonic beam. In this case, the first, nearfield fundamental beam is weighted with the fundamental weighting function 70 of FIG. 5, and the second, farfield fundamental beam is weighted with the fundamental weighting function 72 of FIG. 6. The weighted first and second fundamental and harmonic beams are then added together to create the composite beam that is displayed.

Figure 7:
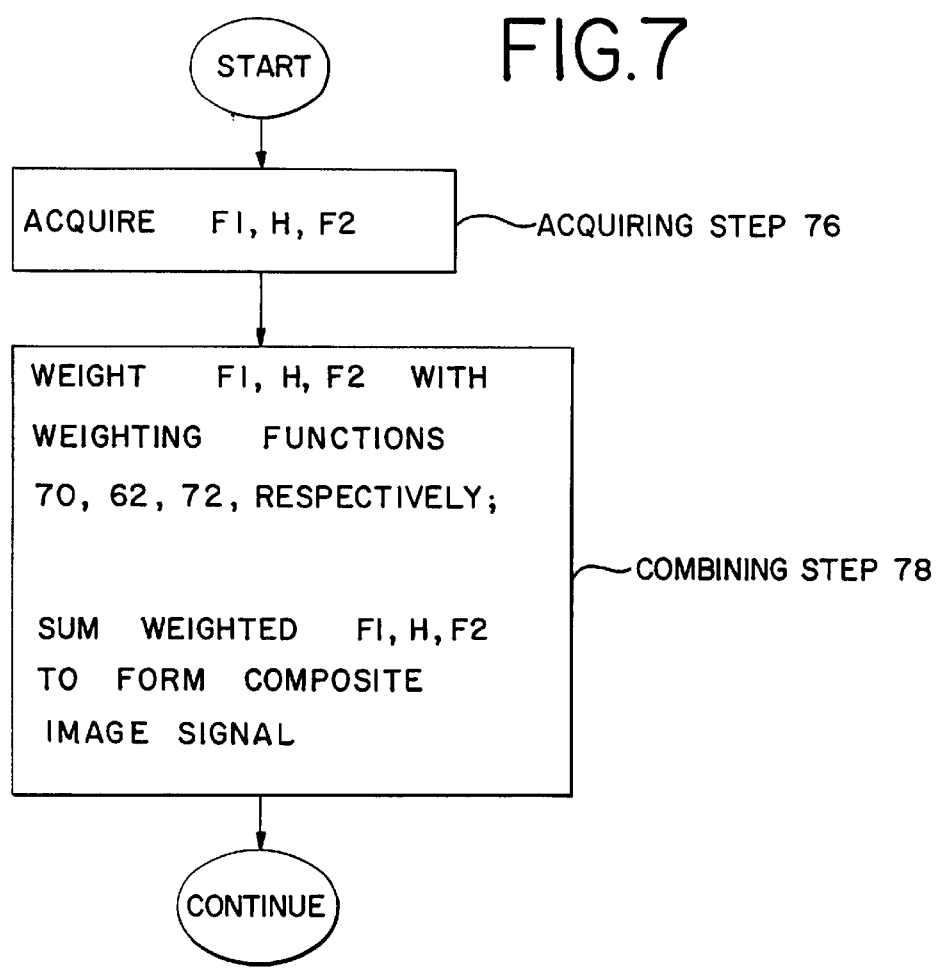
FIG. 7 is a block diagram of a method practiced by the system 10 of FIG. 1.

This method practiced by the system 10 in forming the composite image 40 is flow charted in FIG. 7. As shown in step 76, the first step in this method is to acquire the required image signals. In this case three separate image signals are acquired, each along the same azimuthal direction. The first image signal F1 is a fundamental mode image signal acquired with a nearfield transmit focus. The second image signal H is a harmonic mode image signal acquired with a middlefield transmit focus. The third image signal F2 is a second fundamental mode image signal acquired with a farfield transmit focus.

Figure 5:
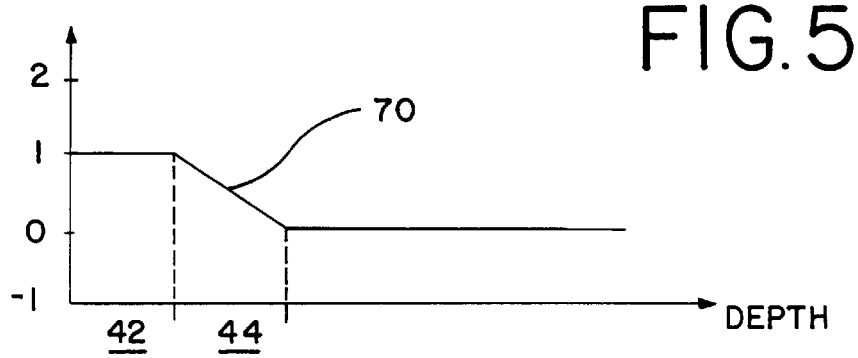
FIGS. 5 and 6 are two separate fundamental weighting functions suitable for use in forming the image of FIG. 2.
Figure 6:
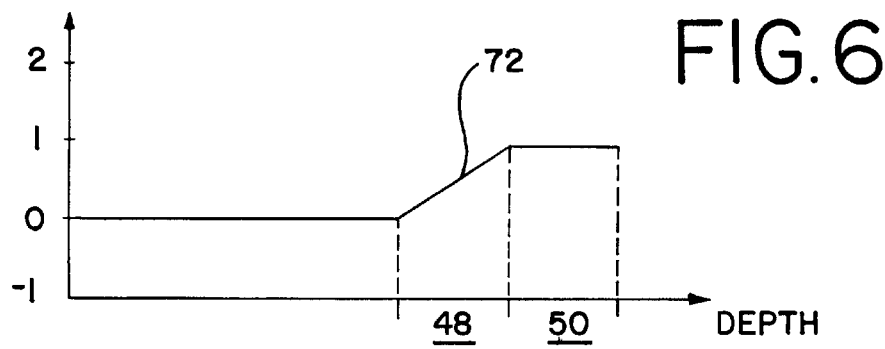

The next step 78 in the method of FIG. 7 is a combining step which includes two component parts. First, the three image signals F1, H and F2 acquired in step 76 are weighted or multiplied by weighting functions 70, 62, and 72, respectively, as shown in FIGS. 5, 4 and 6. The final portion of the combining step 78 is to sum the weighted image signals F1, H and F2 to form the composite image signal that is displayed. The method is then continued with the next set of image signals as appropriate to obtain the composite image signal for the next scan direction.

The acquiring step 76 is performed by the elements 12 through 26 of FIG. 1, and the combining step 78 of FIG. 7 is performed by the scan converter 30 of FIG. 1.

Figure 8:
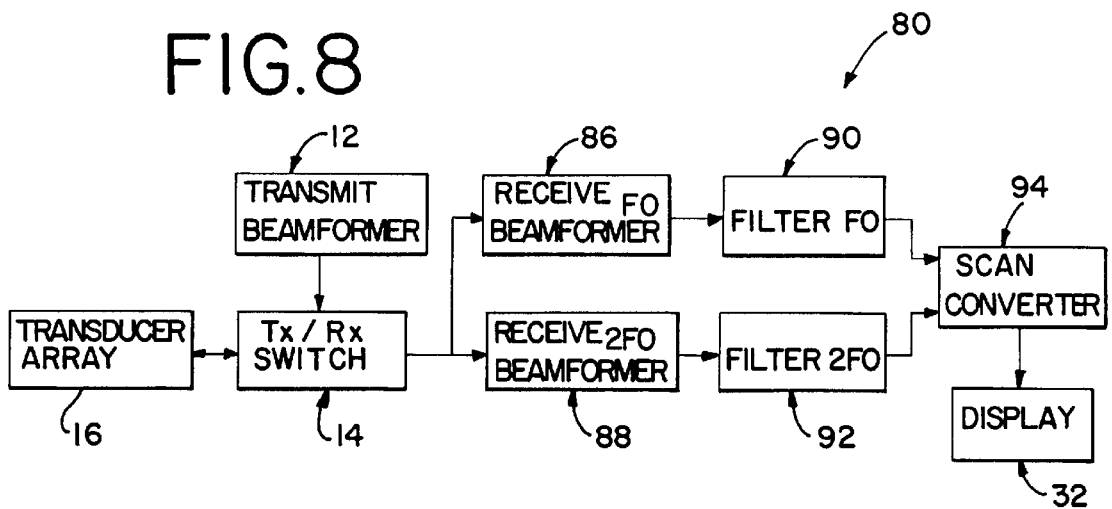
FIG. 8 is a block diagram of another ultrasonic imaging system that incorporates a preferred embodiment of this invention.

FIG. 8 is a block diagram of another ultrasonic imaging system 80 that can be used to practice alternative embodiments of this invention. The system 80 includes a transmit beamformer 12, a transmitreceive switch 14, and a transducer array 16 as described above.

The system 80 includes two separate receive beamformers 86, 88. The receive beamformer 86 forms a receive beam at the fundamental frequency $F_0$, while the receive beamformer 88 forms a receive beam at a second harmonic frequency $2F_0$. The fundamental and harmonic receive beams are applied to filters 90, 92, respectively, before they are combined in the scan converter 94. The combined signal is then supplied for display on the display 32. Because both the fundamental and the receive beams are acquired from the same transmit event, the system 80 improves frame rates and reduces motion artifacts as compared to the system 10 of FIG. 1.

Figure 9:
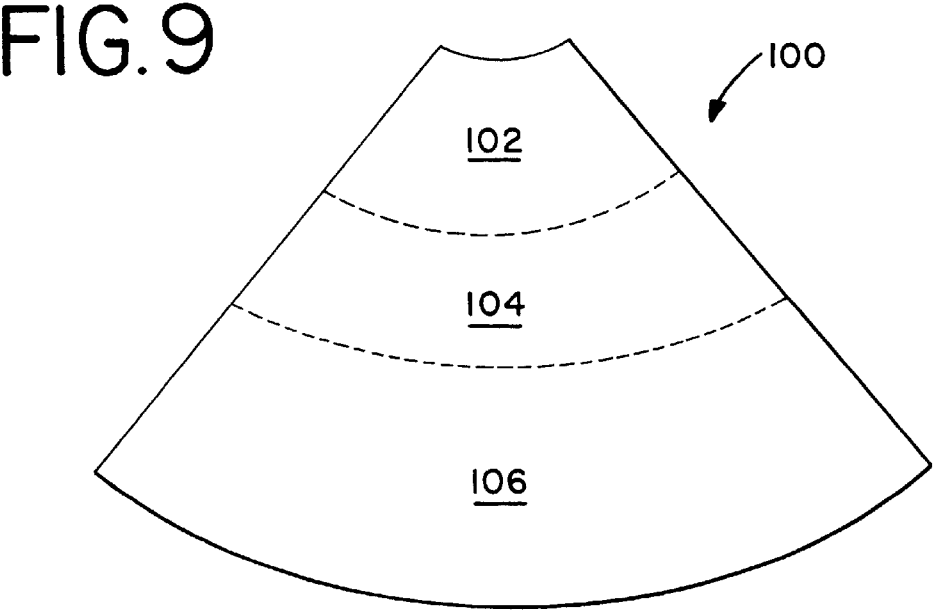
FIG. 9 is a schematic view of a composite image formed with the system of FIG. 8.
Figure 10:
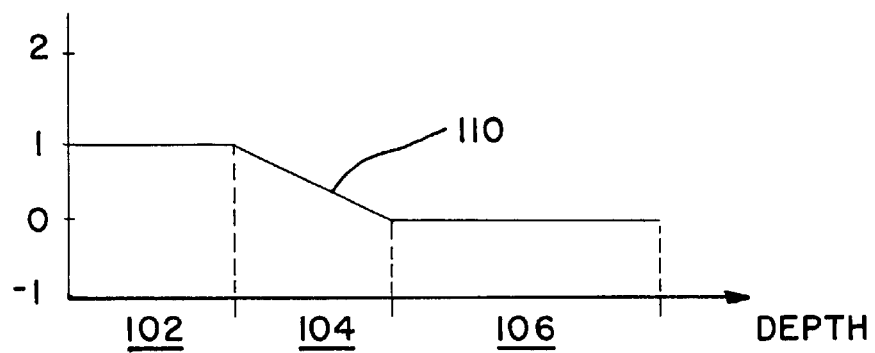
FIGS. 10 and 11 are graphs of fundamental and harmonic weighting functions, respectively, suitable for use in forming the image of FIG. 9.
Figure 11:
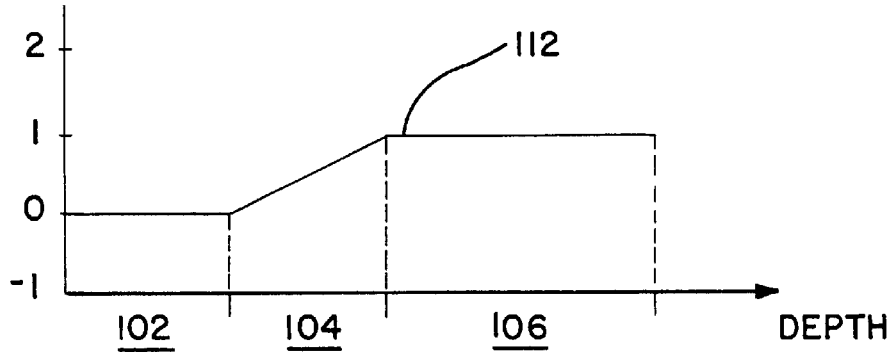

It is not essential in all embodiments that fundamental signals be used in the farfield. For example, in the situation where the display depths are all relatively shallow, a composite image 100 such as that shown in FIG. 9 can be used. The image 100 is divided into three regions; a nearfield region 102, a farfield region 106, and a compounded region 104. The terms nearfield and farfield are not intended to define any specific ranges, but are instead intended to define relative ranges, with the nearfield being closer to the transducer array 16 than the farfield. The imaging systems 10 and 80 of FIGS. 1 and 8 can both be used to generate the composite image 100 of FIG. 9. For example, the piecewise linear fundamental weighting function 110 (FIG. 10) and harmonic weighting function 112 (FIG. 11) can be used to weight the nearfield fundamental data and the farfield harmonic data, respectively. As before, nonlinear weighting functions can be used if desired.

The method performed by the imaging system 80 of FIG. 8 includes acquiring and combining steps similar to those of FIG. 7, except in this case only a single fundamental mode image signal with a nearfield transmit focus and a single harmonic image mode image signal with a farfield transmit focus are obtained along each azimuthal direction. The elements 12 through 14 and 86 through 92 perform the acquiring step, and the scan converter 94 performs the combining step.

The embodiments described above provide the advantages of improved nearfield imaging performance. This improvement in nearfield imaging performance results in an overall image quality that is improved and preserved throughout the imaging depth in technically difficult examinations.

Of course the present invention can be implemented in many other ways. The harmonic and fundamental mode image signals can be acquired using the widest variety of filtering and demodulation techniques. Transmit focal length can be varied as desired, and both single and multiple transmit focus techniques can be used. The multiple image signals combined to form the composite image signal can be obtained in parallel or sequentially. Various beamformers, filters and the like can be used, including those employing analog and digital signal processing techniques.

Similarly, the image signals can be combined to form the composite image signal using many techniques, including look up tables and analog or digital circuits for scaling and summing signals. The combining step can be performed at any desired point in image signal processing after beam formation, and the compounded regions discussed above are not required in all applications.

This invention can be used both with and without the addition of nonlinear contrast agent to the region being imaged. When contrast agent is added, it can be of any suitable type, including a variety of microbubbles. Particular advantages are obtained when no contrast agent is added to the region of interest throughout the imaging session, which may correspond to a medical diagnostic examination. In this case, the harmonic signal return from the nearfield portion of the imaged region is particularly weak, and improved nearfield images are obtained by using the fundamental image signal for the nearfield region as discussed above.

As used herein, the terms fundamental and harmonic mode image signals are intended broadly. Fundamental mode image signals are formed primarily in response to ultrasonic echoes at the same ultrasonic frequency as the dominant transmitted ultrasonic frequency. Harmonic mode ultrasonic image signals are formed primarily in response to ultrasonic echoes having a frequency different from that of the dominant transmitted ultrasonic frequency. The term harmonic is intended broadly to encompass subharmonics, fractional harmonics, and integral harmonics of two or greater. Second harmonic image modes have been found to be particularly useful in clinical applications.

As pointed out above, the term farfield is intended to signify a portion of the imaged tissue farther from the transducer than middlefield, which is in turn farther from the transducer than nearfield. The absolute ranges may vary broadly.

When an imaged region is said to be modulated primarily as a function of a fundamental or a harmonic image signal, the term primarily is intended broadly to include image regions that are modulated solely as a function of the respective harmonic or fundamental signals.

The foregoing detailed description has described only a few of the many forms that the present invention can take. For this reason, this detailed description is intended as an illustration of specific forms of the invention, and not as a definition of the invention. It is only the following claims, including all equivalents, that are intended to define the scope of this invention.

I claim:

1. An ultrasonic imaging method comprising the following steps:

(a) acquiring fundamental mode ultrasonic image signals and harmonic mode ultrasonic image signals from a scanned region with a transducer;

(b) combining the fundamental and harmonic mode image signals of step (a) to form a composite image, said composite image comprising a first image region that is modulated primarily as a function of the fundamental mode ultrasonic image signals and a second image region that is modulated primarily as a function of the harmonic mode ultrasonic image signals, portions of the scanned region associated with the first image region being closer to the transducer than portions of the scanned region associated with the second image region.

2. The method of claim 1 wherein the first and second image regions comprise nearfield and farfield regions, respectively, of the composite image.

3. The method of claim 1 wherein the first and second image regions comprise nearfield and middlefield regions, respectively, of the composite image.

4. The method of claim 1 wherein the composite image formed in step (b) further comprises a third, farfield region that is modulated primarily as a function of the fundamental mode ultrasonic signals.

5. The method of claim 1 wherein the composite image formed in step (b) further comprises a compounded region intermediate the first and second image regions, said compounded region modulated as a function of both the fundamental mode image signals and the harmonic mode image signals.

6. The method of claim 4 wherein the composite image formed in step (b) further comprises first and second compounded regions, said first compounded region intermediate the first and second image regions, said second compounded region intermediate the second and third image regions, said first and second compounded regions modulated as respective functions of both the fundamental mode image signals and the harmonic mode image signals.

7. The method of claim 4 wherein step (a) comprises the step of acquiring the fundamental mode image signals as nearfield fundamental mode image signals with a nearfield transmit focus and as farfield fundamental mode image signals with a farfield transmit focus, wherein the first region of the composite image is modulated primarily as a function of the nearfield fundamental mode image signals and the third region of the composite image is modulated primarily as a function of the farfield fundamental mode image signals.

8. The method of claim 2 wherein step (a) comprises the step of acquiring the fundamental mode image signals with a nearfield transmit focus and the step of acquiring the harmonic mode image signals with a farfield transmit focus.

9. The method of claim 1 wherein step (a) is performed during an ultrasonic medical diagnostic examination session, further comprising the step of (c) maintaining the subject free of added non-linear contrast agent throughout the examination session.

10. A medical ultrasonic diagnostic composite image comprising:

a first image region modulated primarily as a function of fundamental mode ultrasonic image signals acquired from a nearfield portion of a subject;

a second image region modulated primarily as a function of harmonic mode ultrasonic image signals acquired from a portion of the subject at greater ranges than the nearfield portion.

11. The invention of claim 10 wherein the first and second image regions comprise nearfield and farfield regions, respectively, of the composite image.

12. The method of claim 10 wherein the first and second regions comprise nearfield and middlefield regions, respectively, of the composite image.

13. The method of claim 10 wherein the composite image further comprises a third, farfield region that is modulated primarily as a function of fundamental mode ultrasonic image signals acquired from a farfield portion of the subject.

14. The invention of claim 10 wherein the composite image further comprises a compounded region intermediate the first and second image regions, said compounded region modulated as a function of both the fundamental mode image signals and the harmonic mode image signals.

15. The invention of claim 13 wherein the composite image further comprises first and second compounded regions, said first compounded region intermediate the first and second image regions, said second compounded region intermediate the second and third image regions, said first and second compounded regions modulated as respective functions of both the fundamental mode image signals and the harmonic mode image signals.

16. The invention of claim 14 wherein the composite image further comprises first and second compounded regions, said first compounded region intermediate the first and second image regions, said second compounded region intermediate the second image region and a third image region, said first and second compounded regions modulated as respective functions of both the fundamental mode image signals and the harmonic mode image signals.

17. An ultrasonic imaging system comprising:

means for acquiring fundamental mode ultrasonic image signals and harmonic mode ultrasonic image signals from a scanned region with a transducer;

means for combining the fundamental and harmonic mode image signals to form a composite image, said composite image comprising a first image region that is modulated primarily as a function of the fundamental mode ultrasonic image signals and a second image region that is modulated primarily as a function of the harmonic mode ultrasonic image signals, portions of the scanned region associated with the first image region being closer to the transducer than portions of the scanned region associated with the second image region.

18. The invention of claim 17 wherein the first and second image regions comprise nearfield and farfield regions, respectively, of the composite image.

19. The invention of claim 17 wherein the first and second regions comprise nearfield and middlefield regions, respectively, of the composite image.

20. The invention of claim 17 wherein the composite image further comprises a third, farfield region that is modulated primarily as a function of the fundamental mode ultrasonic signals.

21. The invention of claim 17 wherein the composite image further comprises a compounded region, intermediate the first and second image regions, said compounded region modulated as a function of both the fundamental mode image signals and the harmonic mode image signals.

22. The method of claim 20 wherein the composite image further comprises first and second compounded regions, said first compounded region intermediate the first and second image regions, said second compounded region intermediate the second and third image regions, said first and second compounded regions modulated as respective functions of both the fundamental mode image signals and the harmonic mode image signals.

23. The invention of claim 20 wherein the acquiring means comprises means for acquiring the fundamental mode image signals as nearfield fundamental mode image signals with a nearfield transmit focus and as farfield fundamental mode image signals with a farfield transmit focus, wherein the first region of the composite image is modulated primarily as a function of the nearfield fundamental mode image signals and the third region of the composite image is modulated primarily as a function of the farfield fundamental mode image signals.

24. The invention of claim 18 wherein the acquiring means comprises means for acquiring the fundamental mode image signals with a nearfield transmit focus and means for acquiring the harmonic mode image signals with a farfield transmit focus.

25. The invention of claim 17 wherein the acquiring means comprises means for acquiring the fundamental and harmonic mode image signals sequentially.

26. The invention of claim 17 wherein the acquiring means comprises means for acquiring the fundamental and harmonic mode image signals in parallel.

27. The method of claim 1, 10 or 17 wherein the first region is modulated substantially only as a function of the fundamental mode ultrasonic image signals, without any substantial contribution from the harmonic mode ultrasonic image signals.

28. The method of claim 1, 10 or 17 wherein the second region is modulated substantially only as a function of the harmonic mode image signals, without any substantial contribution from the fundamental mode ultrasonic image signals.

* * * * *

UNITED STATES PATENT AND TRADEMARK OFFICE
CERTIFICATE OF CORRECTION

PATENT NO. : 5,897,500
DATED : April 27, 1999
INVENTOR(S) : Danhua Zhao

It is certified that error appears in the above-indentified patent and that said Letters Patent is hereby corrected as shown below:

In column 1, lines 18 and 19, delete "08/638,918" and substitute therefore --08/904,825--.

Signed and Sealed this

Eighth Day of February, 2000

Attest:

Q. TODD DICKINSON

*Attesting Officer*     *Commissioner of Patents and Trademarks*